(12) United States Patent
Watanabe et al.

(10) Patent No.: US 6,874,743 B2
(45) Date of Patent: Apr. 5, 2005

(54) DIRECTION REGULATOR OF DISPLAY

(75) Inventors: Atsushi Watanabe, Shizuoka (JP); Kenichi Hirasawa, Tokyo (JP)

(73) Assignees: Murakami Corporation, Shizuoka (JP); NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 10/467,054

(22) PCT Filed: Dec. 13, 2001

(86) PCT No.: PCT/JP01/10930

§ 371 (c)(1),
(2), (4) Date: Aug. 18, 2003

(87) PCT Pub. No.: WO03/050786

PCT Pub. Date: Jun. 19, 2003

(65) Prior Publication Data

US 2004/0084585 A1 May 6, 2004

(51) Int. Cl.[7] ............................................. E06B 9/17
(52) U.S. Cl. ................ 248/276.1; 248/917; 248/919; 248/921
(58) Field of Search .................... 248/276.1, 287.1, 248/122.1, 161, 157, 917–924

(56) References Cited

U.S. PATENT DOCUMENTS 5,947,440 A * 9/1999 Cho ........................... 361/681
6,189,842 B1 * 2/2001 Bergeron Gull et al. . 248/125.1
6,712,326 B2 * 3/2003 Kurimoto et al. ......... 248/349.1
2003/0075649 A1 * 4/2003 Jeong et al. ................. 248/157
2004/0079858 A1 * 4/2004 Rudolf ........................ 248/919
2004/0084578 A1 * 5/2004 Cho et al. ................. 248/125.1
2004/0149873 A1 * 8/2004 Ishizaki et al. ........... 248/274.1

FOREIGN PATENT DOCUMENTS

| JP | 95767/1985 | 6/1985 |
| JP | 57951/1988 | 4/1988 |
| JP | 171077/988 | 11/1988 |
| JP | 7-15689 | 1/1995 |

* cited by examiner

Primary Examiner—Ramon O. Ramirez
Assistant Examiner—Amy J. Sterling
(74) Attorney, Agent, or Firm—Oblon, Spivak, McClelland, Maier & Neustadt, P.C.

(57) ABSTRACT

A direction regulator H of display, comprising a frame M mounting a member 7 capable of elevating/lowering in the height direction X1. A display fixing part 1 is provided to an upper part of the elevating/lowering member 7. The display fixing part 1 comprises a base member 2 having a spherical receiving face 27A. In front of the base member 2, a cap support 3 comprising a spherical cap body 31 having a curvature substantially identical to that of the receiving face 27A is provided to be urged by a spring 9 through the receiving face 27A of the base member 2. A flange 4 is clamped between the base member 2 and the cap support 3. The flange 4 is slidable along the spherical receiving face 27A of the base member 2. The flange 4 is fixed with a display D through an angle regulating member 5.

10 Claims, 11 Drawing Sheets

DIRECTION REGULATOR OF DISPLAY

TECHNICAL FIELD

The present invention relates to a device for adjusting a display, which supports a display such as CRT for personal computer or a television set, a liquid crystal display, a plasma display or a display utilizing LED in a manner so as to freely adjust the angle of the display.

BACKGROUND ARTS

In recent years, a display for displaying an image such as for a personal computer system or a television set has been intended to be light weight. Such a type of the display is mounted in front of a frame base possessed by a device for supporting a display in such a manner as to freely adjust the angle, whereby the direction of the display can be changed to meet the favorite of a user.

As an example of the device for supporting a display, an elevating device for ascending or descending a liquid crystal monitor as disclosed in Japanese Utility Model No. 3063920. As shown in FIG. 11, the elevating device for ascending or descending a liquid crystal monitor possesses a first supporting mechanism 201A which rotatably supports a liquid crystal 300 around a center axis O at the angel of 90° in the rotating direction X2, and a second supporting mechanism 201B which rotatably supports a liquid crystal 300 around a traverse axis O1 in vertically tilting direction X3 in front of a frame base 200.

However, the elevating device for ascending or descending a liquid crystal monitor disclosed in Japanese Model disclosed above cannot rotate and adjust the monitor in horizontal tilting direction at the rotation around the vertical axis (not shown), unless the frame base 300 itself rotates in the horizontal direction.

In addition, since the first supporting mechanism 201A and the second supporting mechanism 201B are separately assembled, the number of parts making up them is increased according to the increasing of the direction to be adjusted, making it difficult to suppress the increasing of the number of the parts.

Also, the first supporting mechanism 201A is provided at one side of a holing arm 202, which makes up the second supporting mechanism 201B, and the other side of the holding arm 202 is rotatably supported on an upper portion of the frame base 200. Moreover, since the traverse axis O1, which becomes the center P of rotating the liquid crystal monitor 300 in the vertically tilting direction X3, resides at a backward portion of the liquid crystal monitor 300 far from the liquid crystal monitor, even if the user is intended to rotate the liquid crystal monitor 300 to a slight angle, the actual movement distance towards vertically tilting direction X3 becomes unduly large. Consequently, the adjustment of the frame base 200 in the height direction is required every the adjustment of the liquid crystal monitor 300 in the vertically tilting direction X3.

Moreover, depending up the direction of the liquid crystal monitor 300, the center G of the gravity and the traverse axis O1 are sometimes tilted with each other. For this reason, the force of the user for adjusting the direction of the liquid crystal monitor is not always constant. Also, if the liquid crystal monitor 300 is somewhat heavy, the liquid crystal monitor 300 can be fitted in a stable manner only with difficulty unless an additional part such as a spring is provided.

Furthermore, when vibration occurs, the position of moving the liquid crystal monitor 300 is sometimes changed with ease.

An object of the present invention is, therefore, to make a construction which is a simple construction having a reduced number of parts and which makes it easy to adjust the movement of the display in the 90° revolution direction, a vertically tilting direction and horizontal direction at a substantial constant position. Particularly, the object of the present invention is to minimize the movement distance at the time when the display is moved in a vertically tilting direction. Furthermore, the object of the present invention is to make the user to adjust the display always at a constant operation force and not to bring about displacement when vibration or such occurs.

SUMMARY OF THE INVENTION

The invention according to claim 1 in order to solve the problems described above is a device for adjusting a direction of a display having a frame and a display mounter formed on said frame;

said mounter possessing a base member having a receiving face comprising a spherical surface; a cap supporting member, in which a resilient force is applied to said receiving face by a spring, being provided in front of said base member;

a flange provided between said base member and said cap supporting member being sandwiched between said base member and said cap supporting member in such a manner that it can be slid along the receiving face of said base member; and a angle regulating member on which the display is equipped. being provided in front of said flange.

The invention according to claim 2 is the device for adjusting a direction of a display according to claim 1, wherein stoppers, which regulates the range of the slidable movement of the flange, are provided on said cap supporting member and said angle regulating member.

The invention according to claim 3 is the device for adjusting a direction of a display according to claim 2, wherein said stoppers comprise a projection for a stopper projecting from a rear surface of said angle regulating member towards a rear direction of said cap supporting member and a wall for a stopper projecting from a front surface of said cap supporting member towards a front direction of said angle regulating member.

The invention according to claim 4 is the device for adjusting a direction of a display according to claim 1, wherein the center of rotating said flange sliding along said receiving member is positioned in front of said receiving face.

The invention according to claim 5 is the device for adjusting a direction of a display according to claim 2, wherein the center of rotating said flange sliding along said receiving member is positioned in front of said receiving face.

The invention according to claim 6 is the device for adjusting a direction of a display according to claim 3, wherein the center of rotating said flange sliding along said receiving member is positioned in front of said receiving face.

The invention according to claim 7 is the device for adjusting a direction of a display according to claim 4, wherein the center of rotating said flange is substantially accorded with the center of the gravity of the display held by said angle regulating member or said flange.

The invention according to claim 8 is the device for adjusting a direction of a display according to claim 5, wherein the center of rotating said flange is substantially accorded with the center of the gravity of the display held by said angle regulating member or said flange.

The invention according to claim 9 is the device for adjusting a direction of a display according to claim 6, wherein the center of rotating said flange is substantially accorded with the center of the gravity of the display held by said angle regulating member or said flange.

The invention according to claim 10 is the device for adjusting a direction of a display according to any one of claims 1 to 9, wherein a member for ascending and descending said mounter for a display is provided on said frame.

Specifically, the device for adjusting a direction of a display according to the present invention having the configuration described above, can reduce a number of parts making up the mechanism for supporting a display, whereby the adjustment of an angle of the display in the 90° revolution direction, a vertically tilting direction and horizontal direction at a substantial constant position can easily be performed only by a simple construction and a reduced number of parts.

Also, since the movement distance at the time when the display is moved in a vertically tilting direction is small, the adjustment of the height of the frame, which has conventionally required every the adjustment of the liquid crystal monitor 300 in the vertically tilting direction, is not required.

Moreover, since the center of rotating the display is designed to be substantially accorded with the center of the gravity, the user can always adjust the direction of the display always at a constant force with ease. Also, even if vibration or such occurs, the movement position of the display is not easily displaced.

BEST MODES FOR CARRYING OUT THE INVENTION

Figure 1:
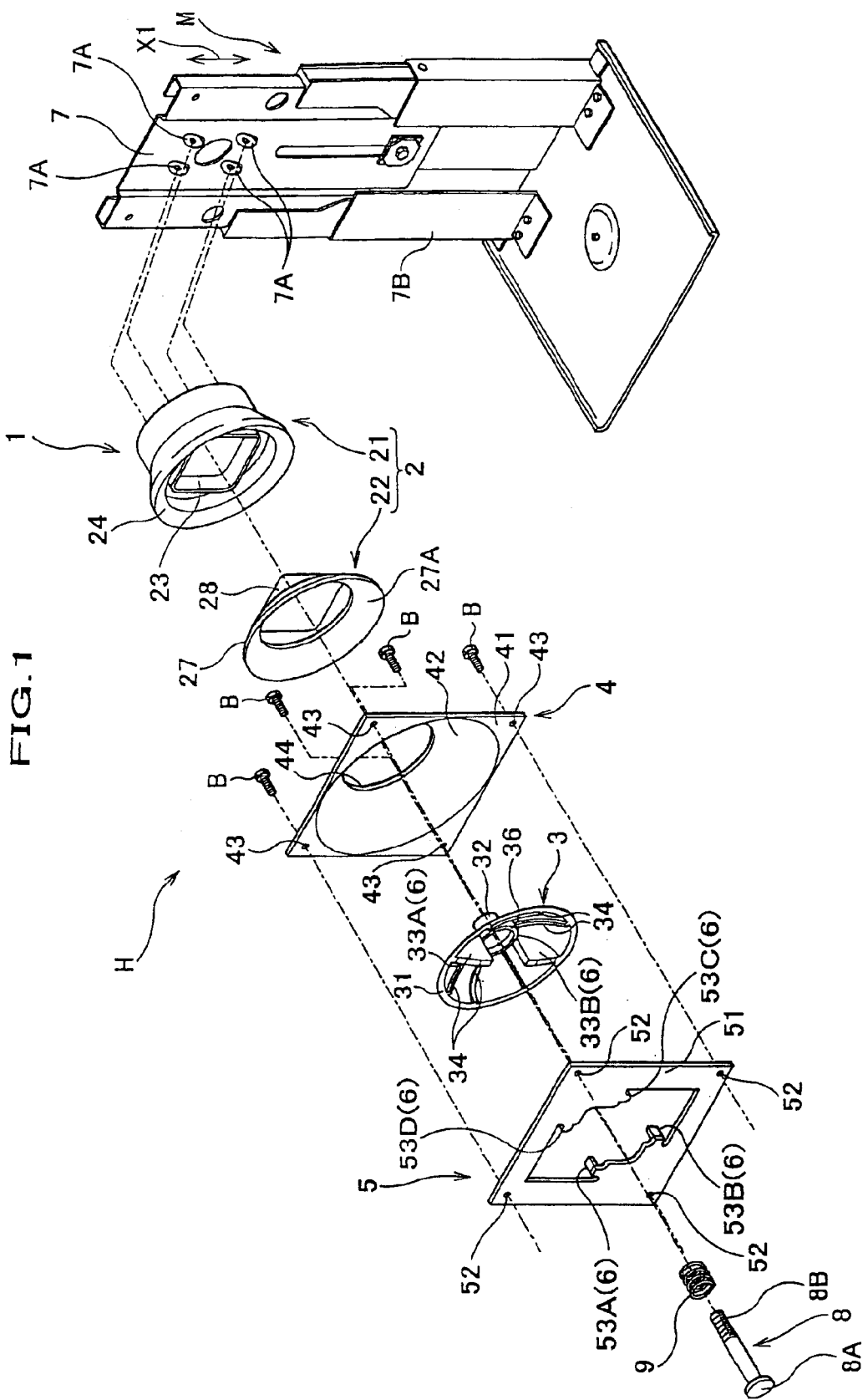
FIG. 1 is an exploded perspective view showing the device for adjusting a direction of a display according to the first embodiment partially showing the main portions.

A first embodiment of the present invention will now be specifically described by referring to the drawings.

FIG. 1 is an exploded perspective view showing the device for adjusting a direction of a display according to the first embodiment partially showing the main portions.

As shown in FIG. 1, a device H for adjusting a direction of a display according to the present invention has a frame M, and a display mounter 1 is provided on an upper portion of the frame M. The display mounter 1 has a base member 2, a cap supporting member 3, a flange 4, and a member 5 for regulating an angle. Also, the cap supporting member 3 is provided in front of the base member 2, and the flange 4 is provided between the cap supporting member 3 and the base member 2. Furthermore, the member 5 for regulating an angle, by which the display is supported is provided in front of the cap supporting member 3. Stoppers 6 are provided on the cap supporting member 3 and the member 5 for regulating an angle in order to regulate the sliding of the flange 4.

On the other hand, the device H for adjusting a direction of a display possesses an elevating member 7 in the height direction X1. On an upper portion of the elevating member 7 are provided four mounting stands 7A, 7A, ..., to which the display mounter 1 is fit. The elevating member 7 is also provided on a frame base 7B in a manner of freely ascending and descending, and a spiral spring (not shown) is provided within the frame base 7B. The spiral spring is provided at a position where it is wound according to the descending the elevating member 7, and is applied to a resilient force to the elevating member 7 from a lower direction so that the resilient force becomes substantial constant regardless of an amount of winding. Moreover, the floor panel of the frame M can be rotated in the horizontal direction, and the horizontal rotation of the floor panel makes it possible to circulate the frame M in the vertical direction.

Subsequently, the base member 2 has a base body 21 and a spacer 22, both made of a resin. At the center of the front side of the base body 21, an inserting projection 23 having a substantial rectangular shape viewing from the front side is formed, and a base stand 24 having a circular shape viewing from the front side is provide around the inserting projection 23. The inserting projection 23 of the base body 21 and the front face of the base stand 24 have the same spherical curve, so that the rear face of the spacer 22 is supported by these inserting projection 23 and the front face of the base stand 24.

Figure 3:
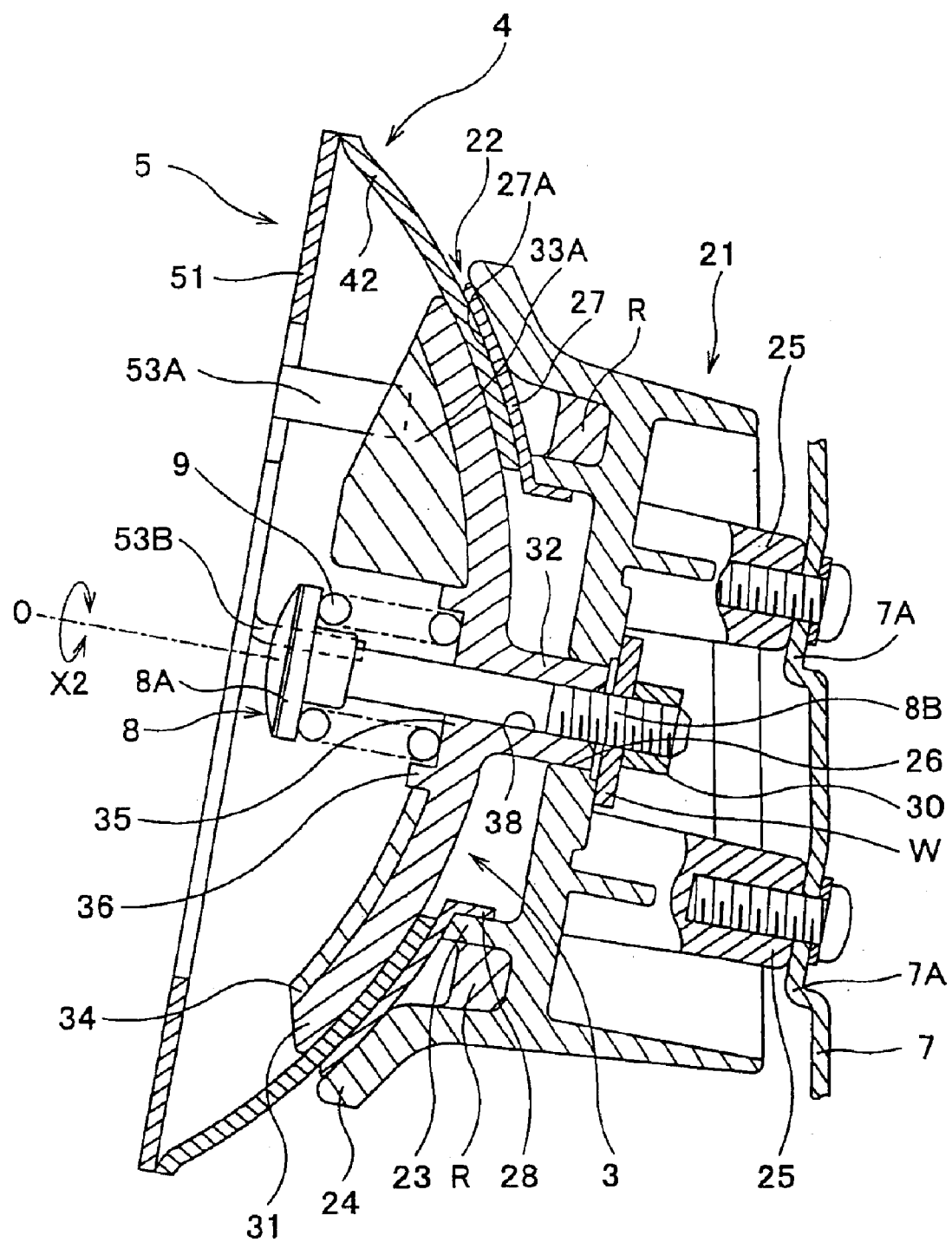
FIG. 3 is a cross-sectional view of FIG. 2 taken along the line III—III.

Furthermore, between the inserting projection 23 and the base stand 24, ribs R and R for imparting strength are provided as shown in FIG. 3. On a rear portion of the base body 21, four bolt mounters 25, 25 ... having bolt pores formed thereon are provided. The bolt mounters 25, 25 are provided on corresponding portions of mounting stands 7A, 7A, ... provided on an upper portion of the elevating member 7, respectively.

An inserting hole 26 as shown in FIG. 3 is formed at a center of the base body 21. The inserting hole 26 has a circular shape viewing from the front side, and a nut 30 is provided on a rear portion thereof via a washer W.

The spacer 22 described above has a pedestal 27 and a rear side inserting portion 28. The front face of the pedestal 27 of the spacer 22 has a spherical shape and the center thereof is formed so that the receiving surface 27 can be largely opened. On the other hand, the rear side inserting portion 28 of the spacer 22 has a substantial rectangular shape viewing from the front side and has a figure similar to the inserting projection 23 of the base body 21 smaller than the later as the thickness of the inserting projection 23. The rear side inserting portion 28 of the spacer 22 is inserted into the inserting projection 23 of the base body 21 to fit the spacer 22 to the base body 21.

The cap supporting member 3 has a cap body 31 and a rear side inserting portion 32. The cap body 31 makes up a part of a spherical shape having the substantially same curvature as that of the receiving face 27A of the pedestal 27 of the spacer 22, and has vertically arranged two wall portions 33A and 33B for a stopper making up a part of the stopper 6 and six reinforcing ribs 34, 34, . . . provided in front thereof. Each of these wall portions 33A and 33B for a stopper is arranged so as to extend in the vertical direction and is provided so as to project towards the front of the member 5 for regulating an angle. On the other hand, the reinforcing ribs 34, 34, . . . are provided so as to slightly project from the front surface of the cap body 31. Furthermore, at a substantially center of the cap body 31, a spring receiver 35 is formed. The spring receiver 35 is formed in the state that it is surrounded by projections 36 each having a circular shape viewing from the front side, and the projection 36 is provided so as to slightly project from the reinforcing rib 34 respect to the front surface of the cap body 31.

The rear side projecting portion 32 provided on a rear surface of the cap body 31 has a cylindrical shape having an external diameter substantially the same as an inner surface of the inserting hole 26 formed at the center of the base body 21, and has a through hole 38 for bolt through which a bolt 8 is bored formed at a central portion thereof. The rear side projecting portion 32 is inserted into an opening formed on the center of the pedestal 27 of the spacer 22, and is inserted into the inserting hole 26 formed at the center of the base body 21.

The flange 4 has a panel portion 41 and a spherical portion 42 at the center of the panel portion 41 having a concave formed on a rear side. The panel portion 41 of the flange 4 has a rectangular shape viewing from the front side, and through holes 43, 43, . . . are formed of the four corners thereof. The spherical portion 42 of the flange 4 makes up a part of the spherical surface having the substantially same curvature as that of the receiving face 27A and the cap body 31 of the cap supporting member 3. At a central portion of the spherical portion 42, an opening 44 is largely formed into which the rear side projecting portion 32 of the cap supporting member 3 is inserted. Furthermore, the spherical portion 42 of the flange 4 is sandwiched between the receiving face 27A of the pedestal 27 of the spacer 22 and the cap body 31 of the cap supporting member 3 in a slidable manner. By such a construction, the flange 4 is held and fitted in the state that it can be rotated around a center axis O at the angel of 90° in the rotating direction X2, around a traverse axis O1 in vertically tilting direction X3, and around a vertical axis O2 in horizontal tilting direction X4 (see FIG. 4).

Figure 6:
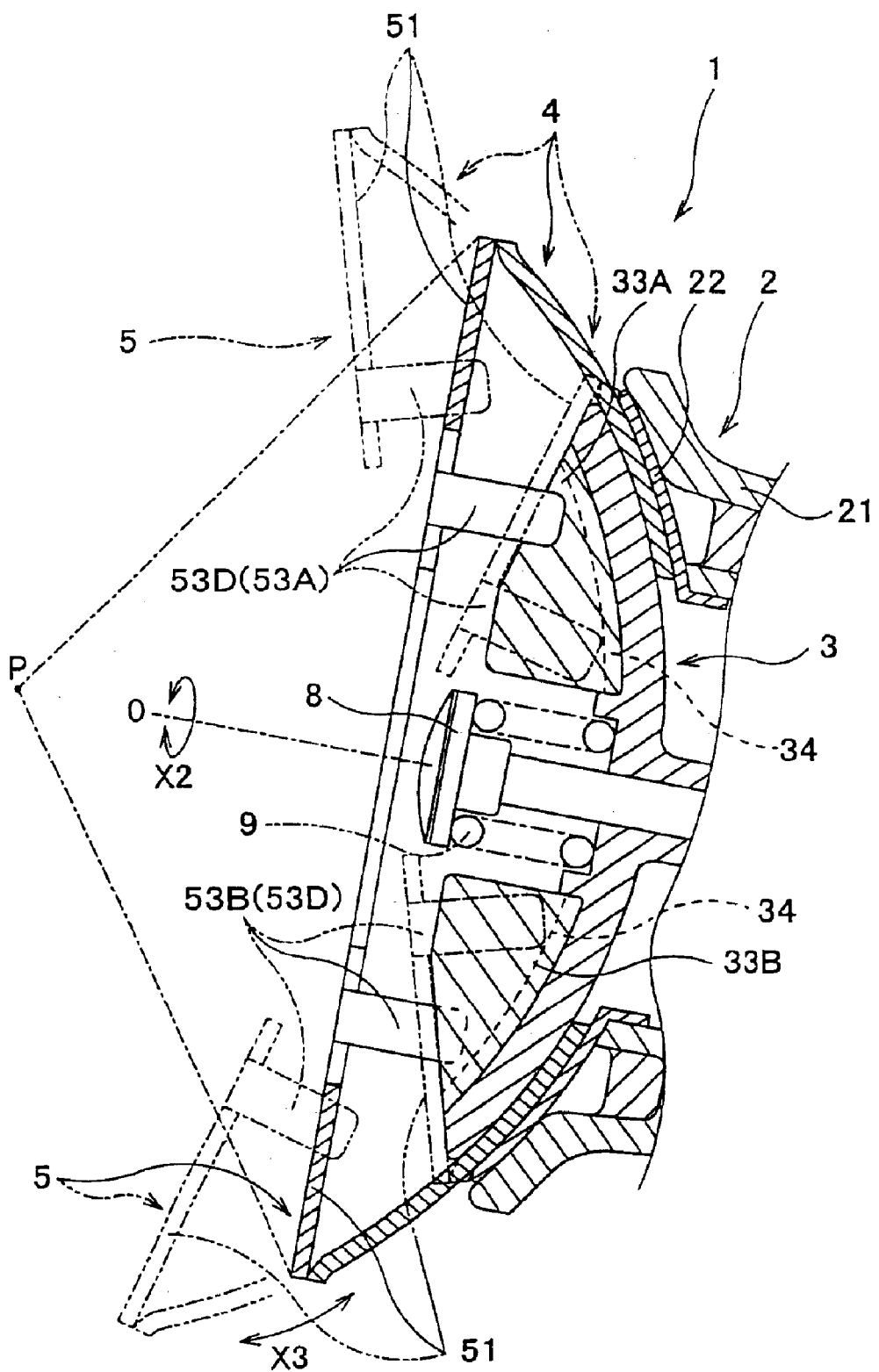
FIG. 6 is an explanatory view showing the rotation of the display mounter.

In this case, as shown in FIG. 6, the center axis O, the traverse axis O1 and the vertical axis O2 are defined as ideal axes passing through an origin, assuming the center P of the rotation of the flange 4 as the origin, which will be utilized in the following description.

In front of the flange 4, the member 5 for regulating an angle is provided. The member 5 for regulating an angle has a plate-from main body 51 having substantially the same sides as those of the panel 41 of the flange 4. Through holes 52, 52, . . . are formed on the positions corresponding to the through holes 43, 43, . . . formed on the four corners of the panel portion 41 of flange 4. Furthermore, Bolts B, B, . . . are inserted into the through holes 43, 43, . . . formed on the flange 4 and the through holes 52, 52, . . . formed on the member 5 for regulating an angle, and these bolts B, B, . . . are screwed into bolt pores (not shown) formed on rear surfaces of the display D shown in FIG. 4. By such a construction, flange 4 and the member 5 for regulating an angle are fixed onto the display D in a co-screwing state.

Figure 4:
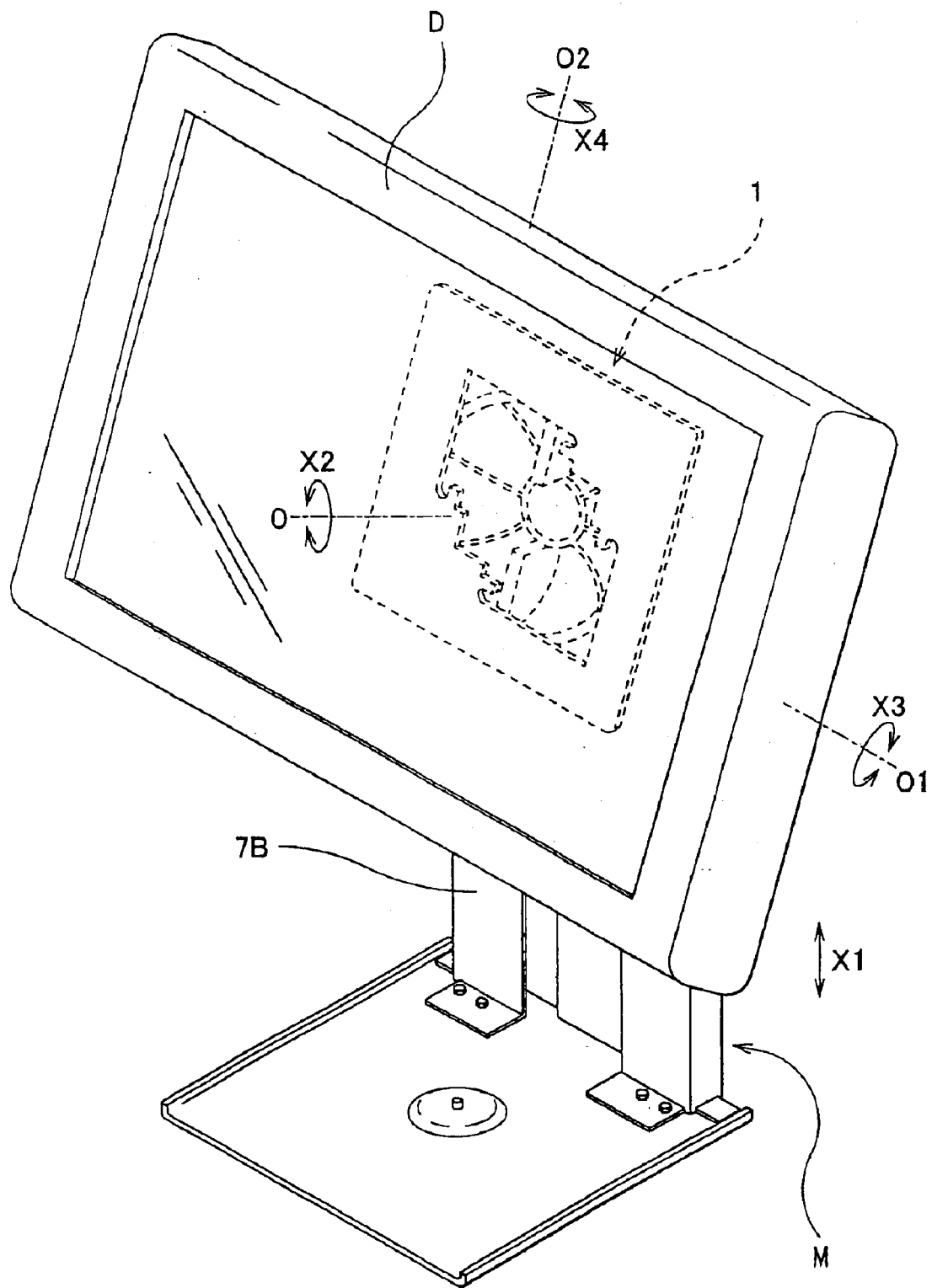
FIG. 4 is a perspective view showing the device for adjusting a direction of a display.
Figure 5:
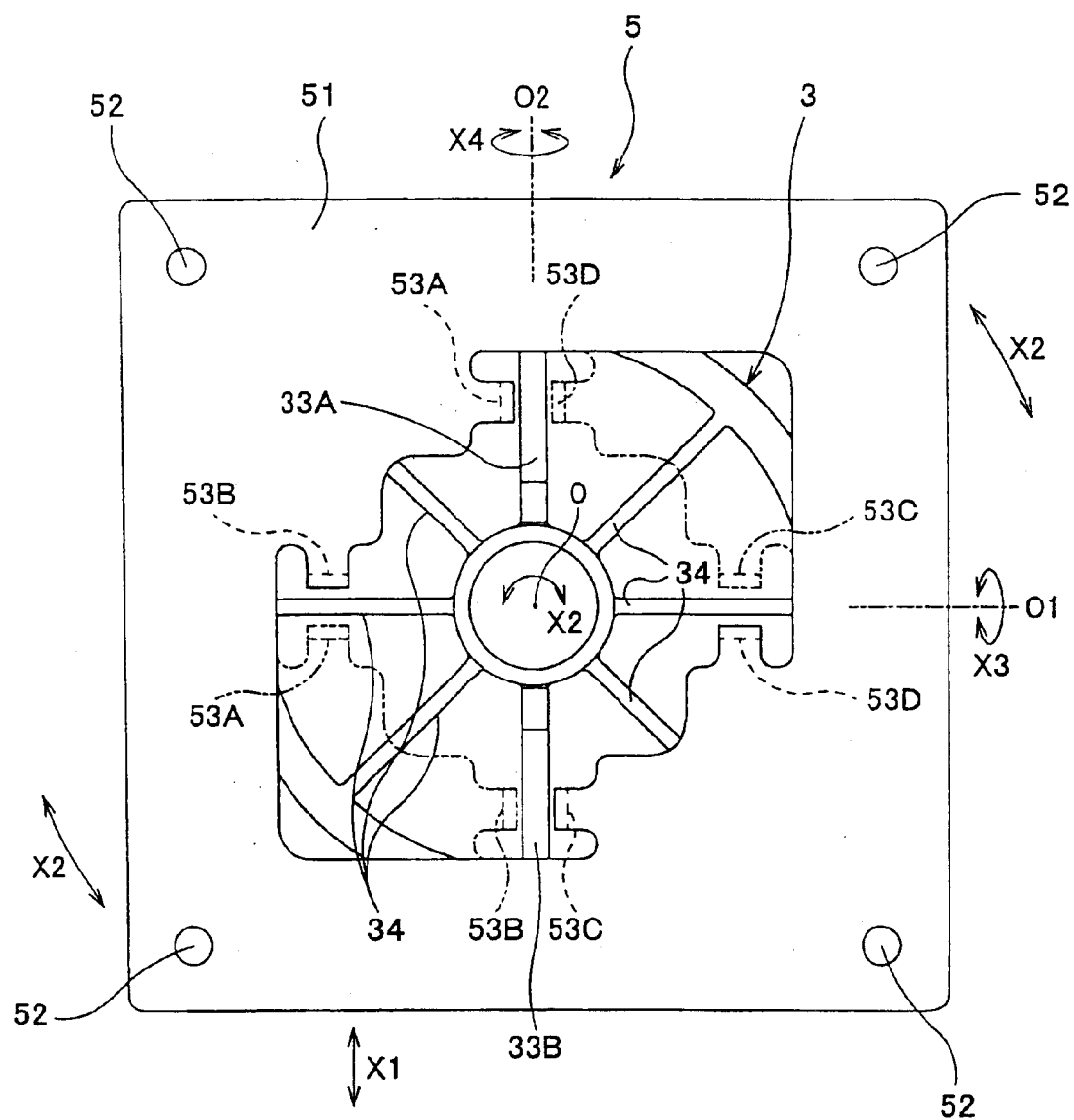
FIG. 5 is an explanatory view showing the rotation of the display mounter.

In addition, four projections 53A, 53B, 53C, and 53D for a stopper, which make up a part of the stopper 6 and which project backward, are formed on the rear surface of the member 5 for regulating an angle. These projections for a stopper 53A to 53D are formed so as to have the same projection amount, and as shown in FIG. 3, each of their lengths are set so as to reach the wall portions 33A and 33B for a stopper formed on a front surface of the cap supporting member 3 and not to reach the reinforcing rib 34. These projections for a stopper 53A to 53D are brought into contact with the wall portions 33A and 33B for a stopper, respectively, whereby the rotation of the member 5 for regulating an angle and the display D held by the member 5 for regulating an angle as shown in FIG. 4 and FIG. 5. This makes it impossible to revolute them any more. The stopper 6 is composed of wall portions 33A and 33B for a stopper provided on the cap supporting member 3 and these projections 53A to 53D for a stopper provided on the member 5 for regulating an angle make up the stopper 6, which regulates the rotation range.

As shown in FIG. 3, the bolt 8 is screwed into the nut 30 provided on a rear side of the base body 21. The bolt 8 has a head portion 8A having a large diameter and a screw portion 8B formed on the edge portion. The screw portion 8B is screwed into the nut 30. The rear surface of the head portion 8A is in a plate form, and a coil spring 9 is intervened between the rear surface and the spring receiver 35 of the cap supporting member 3. The coil spring 9 is fitted in a slightly contracted state.

Here, since the bolt 6 is screwed into the nut 30, the coil spring 9 is in the fixed state fixed to the base member 2. For this reason, the coil spring 9 will expand due to the reverse force to the head portion 8A. At this time, by the resilient force of the coil spring 9, the cap body 31 of the cap supporting member 3 is applied to the resilient force in the direction of the spacer 22. By the application of the resilient force to the cap body 31 in the direction of the spacer 22, the spherical portion 42 of the flange 4 positioned between the cap body 31 and the spacer 22 is sandwiched.

Figure 2:
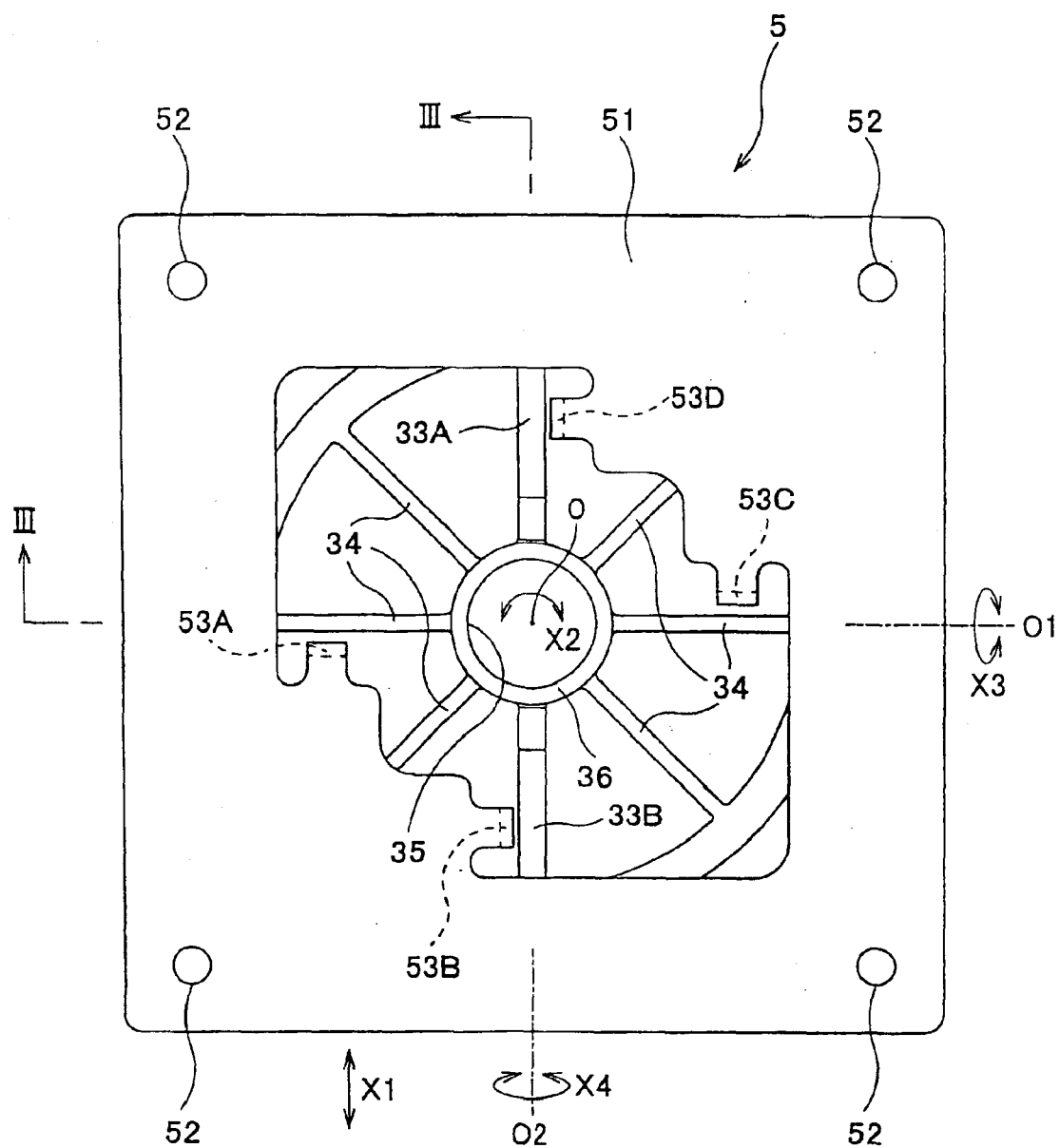
FIG. 2 is a front view of the display mounter.

As described above, the flange 4 is held by the cap supporting member 3 in a manner that the flange 4 can be slid in any of the directions center axis O at the angel of 90° in the rotating direction X2, the traverse axis O1 in vertically tilting direction X3, and vertical axis O2 in horizontal tilting direction X4 as shown in FIG. 2 and FIG. 3.

The device H for adjusting a display having construction as described above according to the present invention will now be described.

In the device H for adjusting a display, the flange 4 is sandwiched between the receiving face 27A of the spacer 22 and the rear surface of the cap supporting member 3, and the display D is held by the flange 4 via the member 5 for regulating an angle. The flange 4 can be slid along the receiving face 27A. By such a structure, as for the display D fitted to the flange 4, the revolution around the center axis O at the angel of 90° in the rotating direction X2, that around the traverse axis O1 in vertically tilting direction X3, and that around the vertical axis O2 in horizontal tilting direction X4 can be performed by only one display mounter 1.

Subsequently, the revolution of the display D around the center axis O at the angel of 90° in the rotating direction X2 will now be described. As shown in an ideal line (double dot line) in FIG. 5, any one of the projections 53B and 53D for a stopper of the member 5 for regulating an angle is brought into contact with any of the wall portions 33A and 33B for a stopper to regulate the movement thereof. It is assumed that at this time, the display D has been turned sideways. In order to turn the display D into the lengthwise direction from this state, when the display D is rotated clockwise around the center axis O shown in FIG. 2 to FIG. 4, the member 5 for regulating an angle is also turned around the center axis O at the angel of 90° in the clockwise rotating direction X2 as shown in FIG. 5. When the display D is rotated clockwise at 90°, now any one of the projections 53A and 53C for a stopper of the member 5 for regulating an angle is brought into contact with any of the wall portions 33A and 33B for a stopper to regulate the movement thereof. At this time, the flange 4 is rotated together with the member 5 for regulating an angle, and the movement is regulated just at the time when they are rotated at 90°. This makes it possible to turn the display which is in the sideway into the lengthwise way.

Next, the revolution of the display D around the traverse axis O1 in vertically tilting direction X3 will now be described. As shown in FIG. 6, the flange 4 can be rotated around the traverse axis O1 shown in FIG. 2 to FIG. 4 relative to the base member 2 and the cap supporting member 3, but the rotation range thereof is regulated. Specifically, by the rotation of the display D around the traverse direction O1, when the flange 4 and the member 5 for regulating an angle is rotated around the traverse direction O1 counterclockwise shown in FIG. 5 from the state where they are positioned at the center shown in the real line to be tilt them downwardly, a lower rear surface of the body 51 of the member 5 for regulating an angle is brought into contact with the wall 33B for a stopper. Also, when the flange 4 and the member 5 for regulating an angle is rotated around the traverse direction O1 clockwise shown in FIG. 5 to be tilt them upwardly, an upper rear surface of the body 51 of the member 5 for regulating an angle is brought into contact with the wall 33B for a stopper. This makes it possible to turn the direction of the display D in vertically tilting direction X3.

Here, when the body portion 51 of the member 5 for regulating an angle is directed downwardly, the projection 53D for a stopper residing above the body portion 51 is never come into contact with the wall 33A for a stopper. However, when the projection 53D for a stopper residing above the member 5 for regulating an angle is not brought into contact with the wall 33A for a stopper, the projection 53B for a stopper residing below the member 5 for regulating an angle is come into contact with the wall 33B for a stopper residing below the cap supporting member 3. In this state, there is a fear that the projection 53B for a stopper residing below the member 5 for regulating an angle is bumped against the reinforcing rib 34 of the cap supporting member 3. However, as shown in FIG. 6 as a broken line, the length of the projection of the reinforcing rib 34 is set to be short, i.e., set so that even if the projection 53B for a stopper comes the closest to the reinforcing rib 34 does not bump against the projection 53B for a stopper. Similarly, it is set that other projections 53A, 53C, and 53D come the closest to the front surface of the cap body 31, they do not bump against the front surface of the cap body 31.

As described above, the body portion 51 of the member 5 for regulating an angle is directed downwardly, the rotation range in an upper direction of the member 5 for regulating an angle and that of the flange 4 can be regulated by means of the projection 53B for a stopper residing below the member 5 for regulating an angle and the wall 33B for a stopper. Conversely, when the body portion 51 of the member 5 for regulating an angle is directed upwardly, the projection 53B for a stopper residing below the member 5 for regulating an angle is not come into contact with the wall 33B for a stopper, but the projection 53D for a stopper residing above the member 5 for regulating an angle is come into contact with wall 33A for a stopper residing above the cap supporting member 3. As described above, when the body portion 51 of the member 5 for regulating an angle is directed upwardly, the rotation range in a lower direction of the member 5 for regulating an angle and that of the flange can be regulated by means of the projection 53D for a stopper residing above the member 5 for regulating an angle and the wall 33A for a stopper of the cap supporting member 3.

At this state, for example, the display D is assumed to be a lengthwise direction, if the display D resides in a width direction, as shown in FIG. 5 as a real line, the projection 53A for a stopper is placed on an upper portion and the projection 53C for a stopper is placed on a lower portion. By functions similar to those of the projections 53D and 53 for a stopper, the rotation of the display D can be regulated. What is more, by placing the stopper at the position where the display D is rotated just at 90°, the display D can easily be set in both the lengthwise direction and the width direction.

In the rotation of the display D shown in FIG. 4 around the vertical axis O2 in horizontal tilting direction X4, in the case where no stopper is provided, the rotation is similar to the rotation of the display D around the traverse axis O1 in vertically tilting direction X3. However, in the case where the projections for a stopper is provided, the rotation of the display D around the vertical axis O2 in horizontal tilting direction X4 is regulated.

Consequently, in the device H for adjusting a direction of a display according to the present invention, the rotation of the display around a center axis O at the angel of 90° in the rotating direction X2, that around a traverse axis O1 in vertically tilting direction X3 and that around a vertical axis O2 in horizontal tilting direction X4, can be performed only by sandwiching the flange 4 by the base member 2 and the cap supporting member 3 in the display mounter 1. Consequently, unlike the prior art in which supporting mechanisms are separately provided in order to meet all the rotation of the display D, a number of parts can be decreased.

Also, in the device H for adjusting the direction of a display according to the present invention, the center P of the rotation of the flange 4 (see FIG. 10), which slides along the receiving face 27A of the pedestal 27 of the spacer 22, in the vertically tilting direction X3 is positioned in front of the receiving face 27A. For this reason, the flange 4, the member 5 for regulating an angle and the display D are rotated around a point positioned in front of the receiving face 27A as a center. By such a construction, when the display is rotated around the vertically tilting direction X3, the movement distance can be reduced in comparison with the prior art.

Furthermore, since the center P of the rotating the flange 4 is positioned in front of the receiving face 27A, the center P of the rotation can be substantially accorded with the center of the gravity of the display D. Specifically, In this embodiment, the center P of the rotating the display D in the vertically tilting direction X3 is accorded with the center of the gravity of the display D.

As described above, since the center P of the rotating the display D in the vertically tilting direction X3 is accorded with the center of the gravity of the display D, the center of the gravity of the display D can be substantially unchanged even when the display is rotated. Consequently, the user can rotate the display D always by substantially the same force, and the display D can effectively be prevented from being felt down towards the front side.

Preferred embodiments of the present invention have been described, but the present invention is not restricted thereto. For example, in order to prevent the display from being rotated due to vibration or such when the display is in the lengthwise or width direction, a ball click for imparting so called click feeling may be provided on the flange and the base member.

Also, the parts described above may be produced in a unified state to further decrease the number of parts. It is noted that materials for each parts may be freely selected, for example, part of or all of the parts may be made of, e.g., a metal, a resin, a reinforcing plastic, or such.

Figure 7:
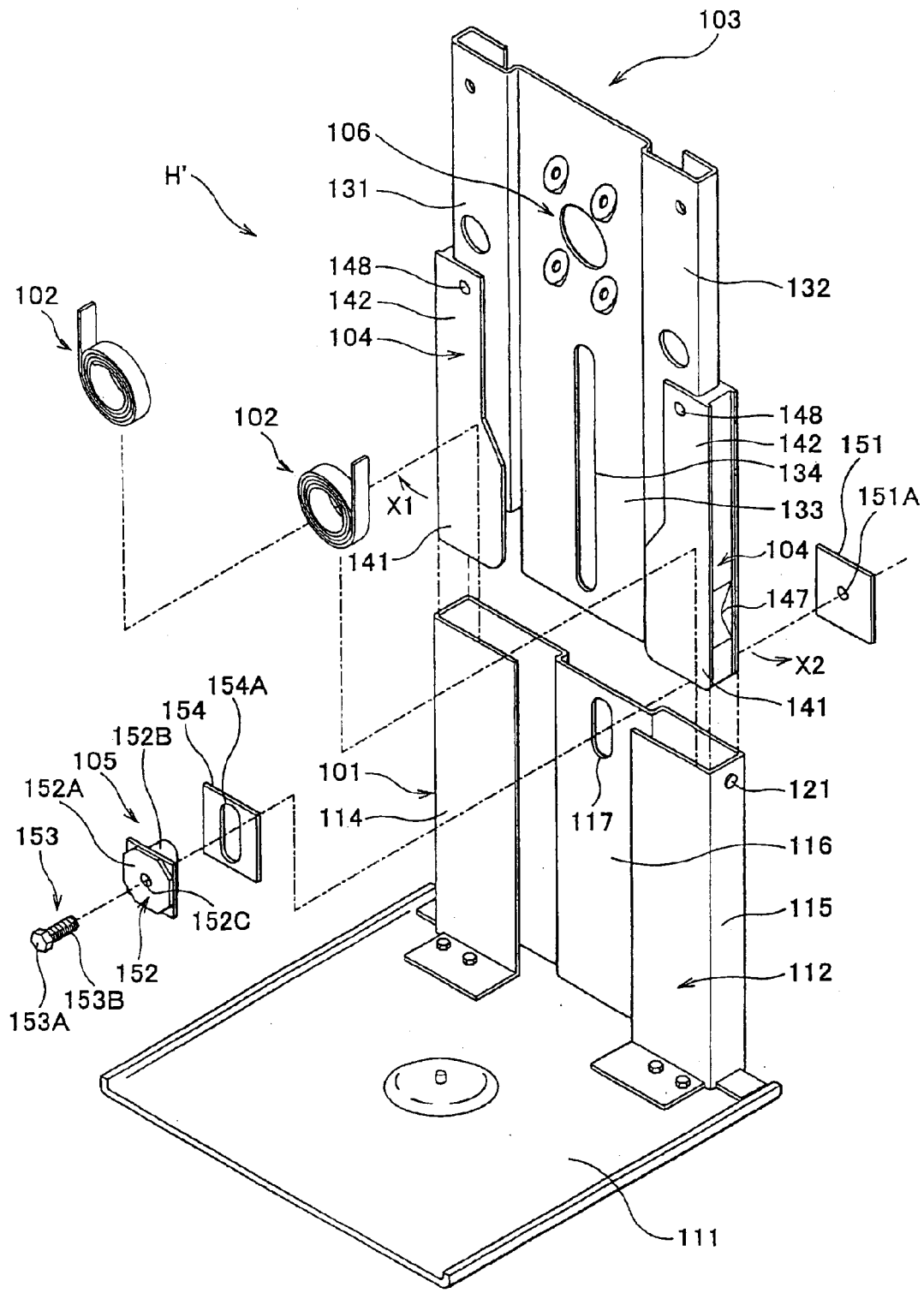
FIG. 7 is an exploded perspective view showing the device for adjusting a direction of a display according to the second embodiment partially showing the main portions.
Figure 8:
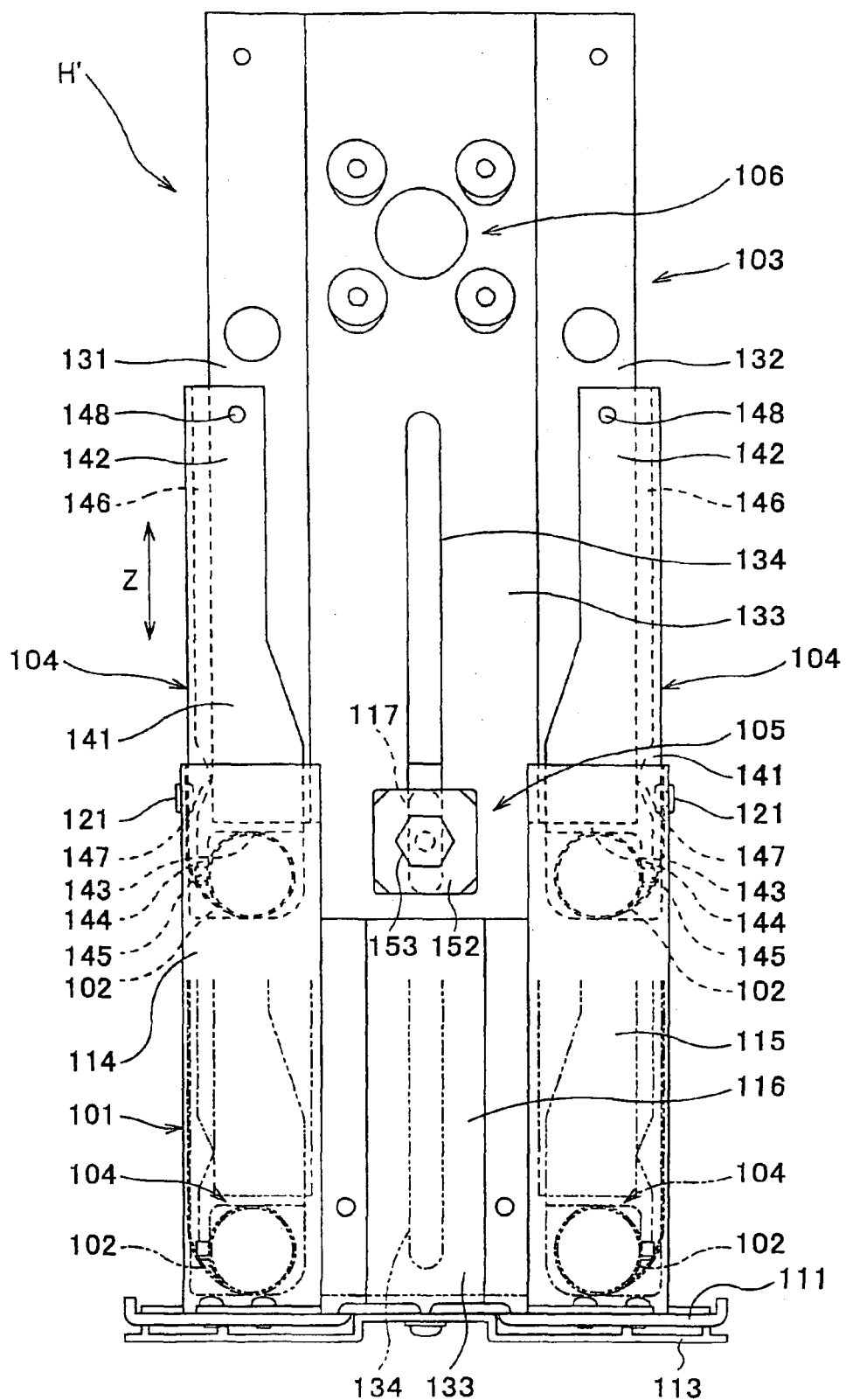
FIG. 8 is a front view of device for adjusting a direction of a display according to the second embodiment.

Subsequently, a second embodiment of the present invention will be described in detail by referring to the drawings. FIG. 7 is an exploded perspective view showing the device for adjusting a direction of a display according to the second embodiment partially showing the main portions, FIG. 8 is a front view thereof, FIG. 9 is a plane view thereof, and FIG. 10 is a perspective view thereof.

As shown in FIG. 7, a device H' for adjusting a direction of a display according to the present invention has a base member 101, spiral springs 102 and 102 and an elevating member 103. Spacers 104 and 104 are fitted to both ends of the elevating member 103, a center guide member 105, which fixes the height position of the elevating member 103 relative to the base member 101 is provided at the central position of elevating member 103 in the height direction. To a display mounter 106 is similar to that of the first embodiment.

Figure 9:
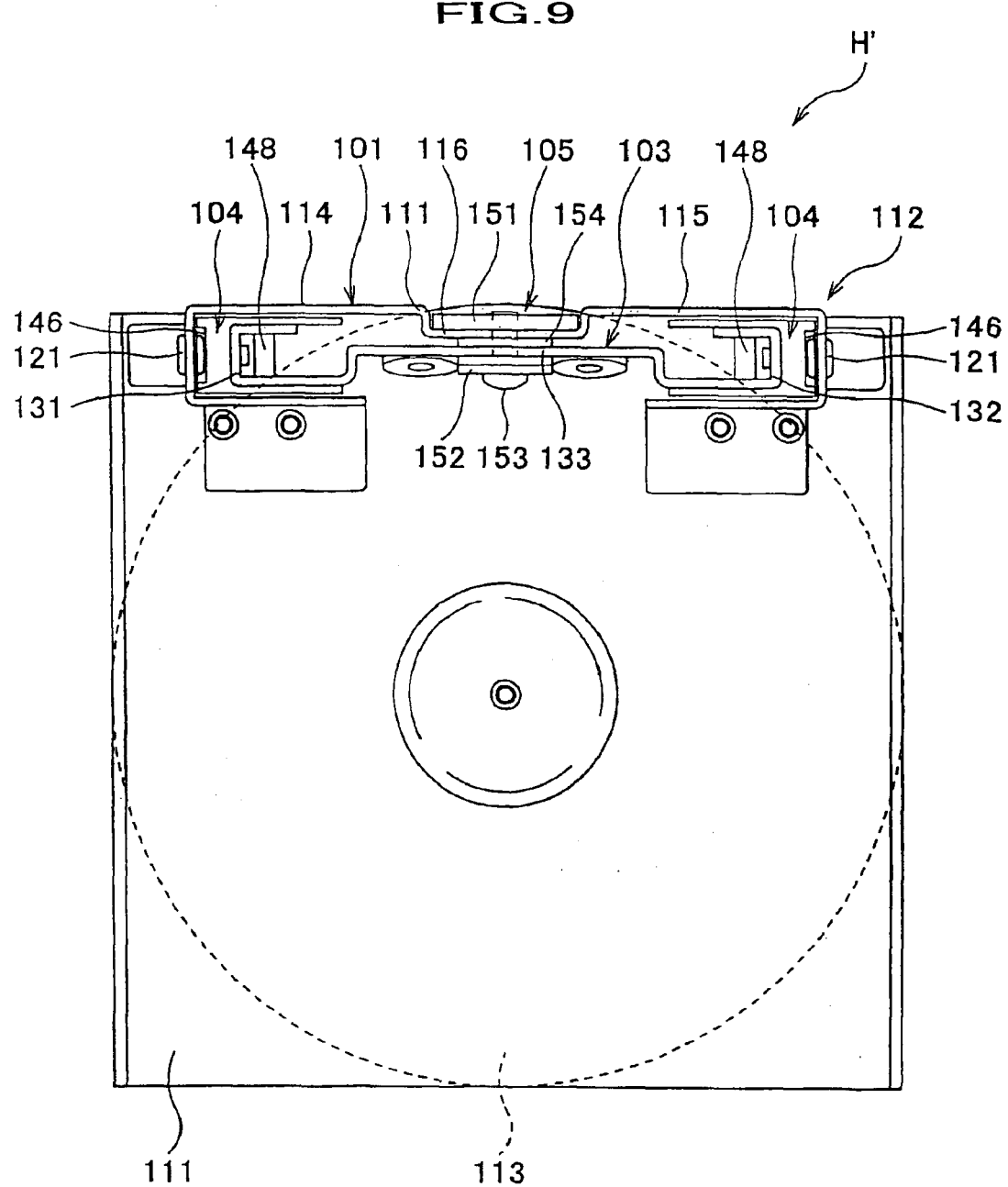
FIG. 9 is a plane view of device for adjusting a direction of a display according to the second embodiment.
Figure 10:
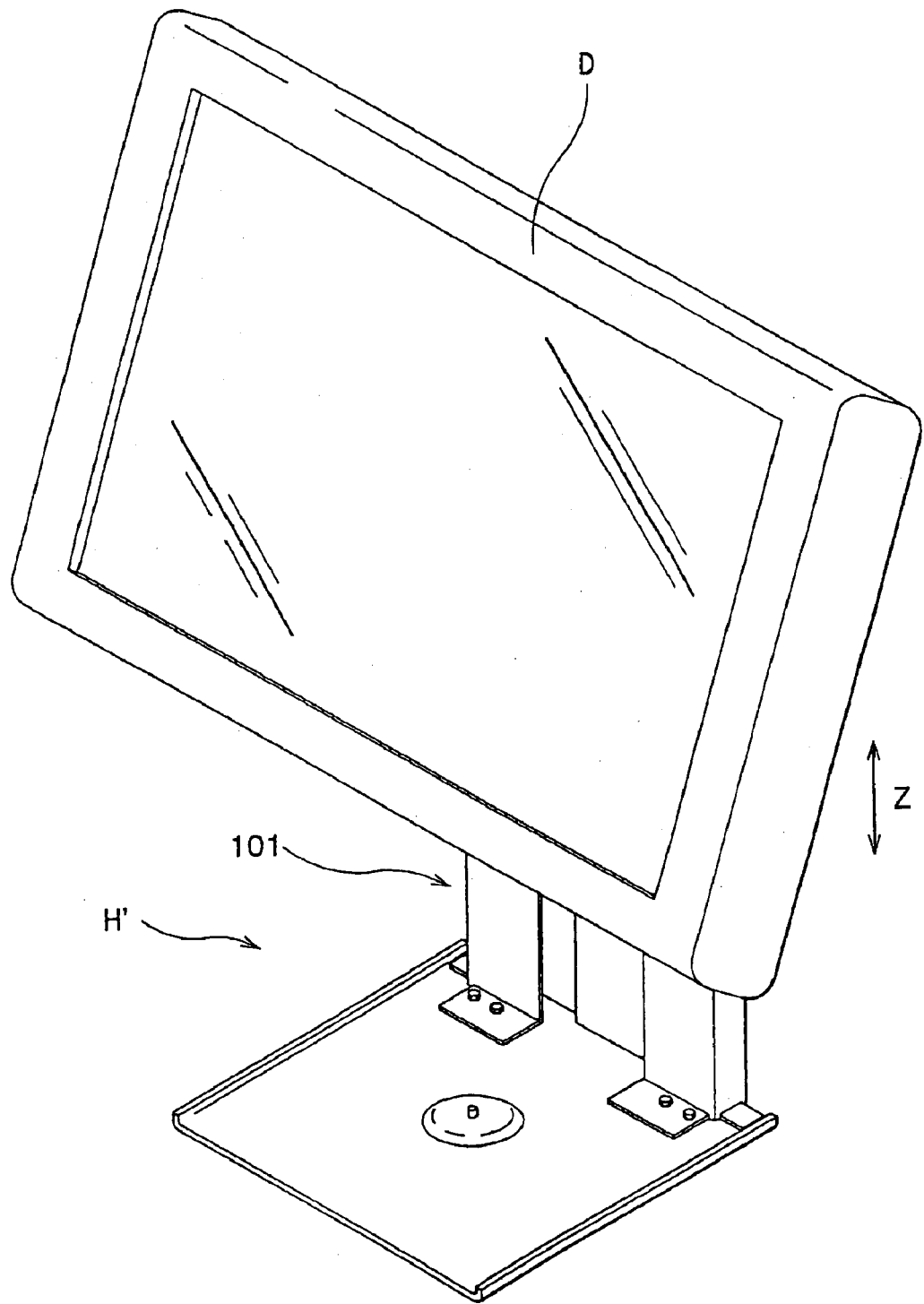
FIG. 10 is a perspective view of device for adjusting a direction of a display according to the second embodiment.
Figure 11:
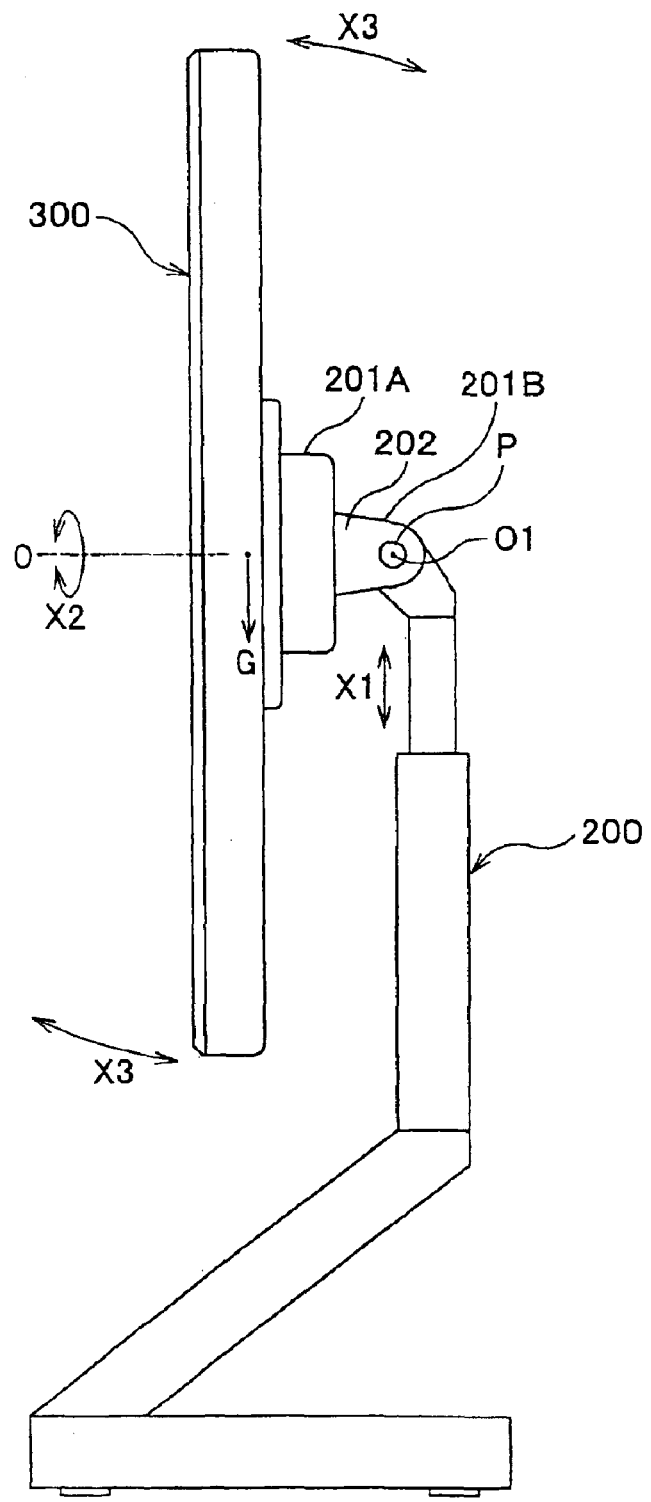
FIG. 11 is a side view of the conventional device for adjusting a direction of a display.

The base member 101 has a pedestal 111 and a holder 112. a circular rotation table 113 shown in FIG. 9 as a broken line is provided within the pedestal 111 so as to be able to rotate in the vertical direction. The holder 112 is ma de of a metal, stands along one end of the pedestal 111, and guide portions 114 and 115, which form slide groove extending towards a vertical direction, are proved on both ends of the holder 112 viewing from the front side. The space between the guide portions 114 and 115 is opened at the front side, and has a center guide portion 116 for connecting the guide portions 114 and 115 provided at a rear side. The center guide portion 116 of the holder 112 is formed so that it is bent to slightly project toward a front side, and has a through hole 117 formed on an upper side thereof. As described above, since the center guide portion 116 of the holder 112 is formed into a shape so as to project towards a front side, and since it is guided and supported by the center guide member 105, it prevents the device H' for adjusting a direction of a display from being felt down towards the front side due to the weight of the display D and from being unduly moved towards a horizontal direction.

Spiral springs 102 and 102 are provided within the guide portions 114 and 115, respectively, and one ends of the spiral springs 102 and 102 are fixed onto inner sides of the guide portions 114 and 115 by means of fixing members 121 and 121. The spiral springs 102 and 102 are fitted so that the winding portions thereof are wounded following the descending of the elevating member 103. Also, when the winding portions of the spiral springs 102 and 102 are wounded as described above, the resilient forces thereof are directed towards a direction that the elevating member 103 is pushed up. In this case, the resilient forces of the spiral springs 102 and 102 are always at substantial constant regardless of an amount of winding.

The elevating member 103 is made of a metal, and has inserting portions 131 and 132 which are inserted into the guide portions 114 and 115 of the base member 101, respectively provided thereon. These inserting portions 131 and 132 of the elevating member 103 are inserted into the guide portions 114 and 115 of the base member 101 so that the elevating member 103 may be relatively moved toward the vertical direction (Z direction in FIG. 8) relative to the base member 101. The space between the inserting portions 131 and 132 of the elevating member 103 is opened at the rear side, and is connected at a front side to a central portion 133 formed so that it is bent to slightly project toward a rear side. The central portion 133 has the display mounter 106 provided at an upper portion, and the display mounter 106 is fitted so that the display D can be mounted as shown in FIG. 10. Furthermore, the display mounter 106 provided on the central portion 133 of the elevating member 103 has a slider-inserting pore having an oval shape which possesses a linear portion extending towards a height direction formed on a lower portion.

Spacer 104 and 104 are provided on the outer sides of the inserting portions 131 and 132 of the elevating member 103, respectively. The spacers 104 and 104 are made of a resin, they have a size one size smaller than that of the inserting portions 131 and 131 of the elevating member 103, and lower portions 141 and 141 are wider than upper portions 142 and 142 thereof viewing from the front side. As shown in FIG. 8 as a broken line, within the interiors of the lower portions 141 and 141 of the spacers 104 and 104, bottom portions 143 and 143 are provided respectively. Flanges 144 and 144 are provided on the outsides of the bottom portions 143 and 143 of the spacers 104 and 104, respectively, and winding guides 145 and 145 are provided on lower ends of the flanges 144 and 144, respectively. Specifically, when the spacers 104 and 104 are inserted into the inserting portions 131 and 131 of the elevating member 103, the winding portions of the spiral springs 102 and 102 are come into contact with the bottom portions 143 and 143 of the spacers 104 and 104 to support the elevating member 103.

Furthermore, groove portions 146 and 146 are provided on outsides of the spacers 104 and 104, and deforming portions 147 and 147 projecting inwardly are unified at lower portions of the groove portions 146 and 146. The groove portions 146 and 146 of the spacers 104 and 104 are configured so that expanding portion of the spiral springs 102 and 102 expanded when the elevating member 103 descends are inserted. At the time when the elevating member 103 is inserted into the guide portions 114 and 115 of the base member 101, the spacers 104 and 104 are come into contact with the guide portions 114 and 115, and they are guided by the guide portions 114 and 115 to vertically move together with the elevating member 103.

Upper portions potions 142 and 142 of the spacers 104 and 104 are rotatably fitted to the elevating member 103 by means of shafts 148 and 148 so that they can be waved in the X1 direction and X2 direction shown in FIG. 7. The deforming portions 147 and 147 of the spacers 104 and 104 are come into contact with the side surfaces of the inserting portions of the elevating member 103 and apply resilient forces so that the spacers 104 and 104 are slightly pushed up to the outer side. In this case, since the spacers 104 and 104 are made up of a resin, for example, even if the guide portions 114 and 115 are made of a metal, generation of uncomfortable sound at the time of rubbing metals and galvanic corrosion due to the contact with metals can be prevented.

Furthermore, the center guide member 105 possesses a square nut 151, a slide stopper 152, a bolt 153, and a packing spacer 154. The square nut 151 is fixed on the rear surface of the center guide portion 116 of the holder 112, and a bolt pore 151A is formed on the central portion thereof. The slide stopper 152 is made of a resin and is provided on a front side of the elevating member 103, and has a body 152A and an inserting portion 152B. A through hole 152C for a bolt which is pierced between the body 152A and the inserting portion 152 is formed on the slide stopper 152B. The inserting portion 152A of the slide stopper 152 has a cross-sectional shape substantially similar to that of the shape of the opening of a pore 134 for inserting a slider formed in the elevating member 103. An inserting portion 152B of the slide stopper 152 is inserted into the pore 134 for inserting a slider.

The bolt 153 of the center guide member 105 has a head portion 153A and a screw portion 153B. The screw portion 153B of the bolt 154 is inserted into the through hole 152C for a bolt form on the slide stopper 152 from a front side, and passed through the pore 134 for inserting a slider of the elevating member 103, and is screwed into the bolt pore 151A formed on the square nut 151. By the clamping force of the bolt 153, the elevating member 103 and the base member 101 are sandwiched by the square nut 151 and the slide stopper 152 so as to prevent the elevating member 103 from being felt down toward the base member 101 and to regulate the horizontal movement of the elevating member 103.

The packing spacer 154 is made of a resin and as shown in FIG. 9, it is provided between the elevating member 103 and the base member 101. On the packing spacer 154, a through hole 154A for a bolt having an opening with the shape substantially the same as the opening of the through hole 117 formed on base member 101 is formed. The packing spacer 154 is positioned so that the through hole 154A for a bolt is overlapped with the through hole 117 of the base member 101. By placing the packing spacer 154 between the base member 101 and the elevating member 103 as described above, generation of uncomfortable sound at the time of rubbing metals and galvanic corrosion due to the contact with metals can be prevented.

To the device H' for adjusting a direction of a display having such a construction is fitted, for example, a display D as shown in FIG. 10. The device H' for adjusting a direction of a display is used by the user in the state where the height is adjusted to the position desired for the user depending on the condition. In the device H' for adjusting a direction of a display, the elevating member 103 is inserted into the guide portions 114 and 115 of the base member 101. At this time, the inserting portions 131 and 132 of the elevating member 103 slightly push up the deforming portions 147 and 147, to apply the reproducing resilient force to the deforming portions 147 and 147. For this reason, the spacers 104 and 104 are pushed up in an elastic manner to the side portions of the guide portions 114 and 114 (X1 direction and X2 direction in FIG. 7) By such a construction, at the time of ascending or descending the elevating member 103, the elevating member 103 slides to the guide portions 114 and 115 by the friction depending upon the reproducing resilient force of the deforming portions 147 and 147. Also, as described above, the clearance between the base member 101 and the elevating member 103, i.e., between the guide portions 114 and 115 of the base member 101 and the inserting portions 131 and 131 of the elevating member 103, is removed to support smooth vertical movement of the elevating member 103 relative to the base member 101.

It is noted that the elevating member 103 as described above is freely operated as a rule, but by adjusting the bolt 153 of the center guide member 105 the operation force of the elevating member 103 may be lightened or by tightly clamping the bolt 153, the elevation of the elevating member 103 may be regulated.

Also, the parts described above may be produced in a unified state to further decrease the number of parts. It is noted that materials for each parts may be freely selected, for example, part of or all of the parts may be made of, e.g., a metal, a resin, a reinforcing plastic, or such.

INDUSTRIAL APPLICABILITY

As described above, the device for adjusting a direction of a display according to the present invention is suitable for use in a supporting device which supports a display such as CRT for personal computer or a television set, a liquid crystal display, a plasma display or a display utilizing LED in a manner so as to freely adjust the angle of the display.

What is claimed is:

1. A device for adjusting a direction of a display having a frame and a display mounter formed on said frame;

said mounter possessing a base member having a receiving face comprising a spherical surface; a cap supporting member, in which a resilient force is applied to said receiving face by a spring, being provided in front of said base member;

a flange provided between said base member and said cap supporting member being sandwiched between said base member and said cap supporting member in such a manner that it can be slid along the receiving face of said base member; and a angle regulating member on which the display is equipped being provided in front of said flange.

2. The device for adjusting a direction of a display according to claim 1, wherein stoppers, which regulates the range of the slidable movement of the flange, are provided on said cap supporting member and said angle regulating member.

3. The device for adjusting a direction of a display according to claim 2, wherein said stoppers comprise a projection for a stopper projecting from a rear surface of said angle regulating member towards a rear direction of said cap supporting member and a wall for a stopper projecting from a front surface of said cap supporting member towards a front direction of said angle regulating member.

4. The device for adjusting a direction of a display according to claim 1, wherein the center of rotating said flange sliding along said receiving member is positioned in front of said receiving face.

5. The device for adjusting a direction of a display according to claim 2, wherein the center of rotating said flange sliding along said receiving member is positioned in front of said receiving face.

6. The device for adjusting a direction of a display according to claim 3, wherein the center of rotating said flange sliding along said receiving member is positioned in front of said receiving face.

7. The device for adjusting a direction of a display according to claim 4, wherein the center of rotating said flange is substantially accorded with the center of the gravity of the display held by said angle regulating member or said flange.

8. The device for adjusting a direction of a display according to claim 5, wherein the center of rotating said flange is substantially accorded with the center of the gravity of the display held by said angle regulating member or said flange.

9. The device for adjusting a direction of a display according to claim 6, wherein the center of rotating said flange is substantially accorded with the center of the gravity of the display held by said angle regulating member or said flange.

10. The device for adjusting a direction of a display according to any one of claims 1 to 9, wherein a member for ascending and descending said mounter for a display is provided on said frame.

* * * * *